United States Patent [19]

Jones et al.

[11] Patent Number: 5,859,107
[45] Date of Patent: Jan. 12, 1999

[54] METHOD AND COMPOSITION FOR TREATING METAL SURFACES

[75] Inventors: Lawrence E. Jones, Reading; Michael D. Wert, Laureldale; José B. Rivera, Philadelphia; Ted M. Schlosser, Tamaqua, all of Pa.

[73] Assignee: Bulk Chemicals, Inc., Reading, Pa.

[21] Appl. No.: 774,935

[22] Filed: Dec. 20, 1996

Related U.S. Application Data

[63] Continuation of Ser. No. 112,890, Aug. 27, 1993, abandoned, which is a continuation-in-part of Ser. No. 982,874, Nov. 30, 1992, abandoned.

[51] Int. Cl.$^6$ .......................... C09D 120/04; C08K 3/10; C08K 3/16
[52] U.S. Cl. .......................... 524/406; 524/413; 148/247; 148/251; 427/327; 427/388.4; 427/409
[58] Field of Search .................................... 524/406, 413; 148/247, 251; 427/327, 388.4, 409

[56] References Cited

U.S. PATENT DOCUMENTS

| | | |
|---|---|---|
| 3,160,506 | 12/1964 | O'Connor et al. . |
| 3,447,972 | 6/1969 | Wilde, Jr. et al. . |
| 3,682,713 | 8/1972 | Ries et al. . |
| 3,687,882 | 8/1972 | Bishop . |
| 3,796,582 | 3/1974 | Leahey et al. . |
| 3,846,182 | 11/1974 | Huff et al. . |
| 3,865,617 | 2/1975 | Shimizu et al. . |
| 3,907,612 | 9/1975 | Atkiss ........................................ 148/28 |
| 3,912,548 | 10/1975 | Faigen . |
| 3,960,610 | 6/1976 | Steinbrecher et al. . |
| 3,964,936 | 6/1976 | Das . |
| 4,136,073 | 1/1979 | Muro et al. . |
| 4,148,670 | 4/1979 | Kelly . |
| 4,191,596 | 3/1980 | Dollman et al. . |
| 4,338,233 | 7/1982 | Das et al. . |
| 4,341,877 | 7/1982 | Das et al. . |
| 4,370,177 | 1/1983 | Frelin et al. . |
| 4,385,096 | 5/1983 | Wetzel . |
| 4,422,886 | 12/1983 | Das et al. . |
| 4,473,618 | 9/1984 | Adzima et al. . |
| 4,503,907 | 3/1985 | Tanaka et al. . |
| 4,609,591 | 9/1986 | Pollet et al. . |
| 4,692,494 | 9/1987 | Sonenstein ............................. 525/57 |
| 4,846,898 | 7/1989 | Natlie ...................................... 148/251 |
| 4,855,363 | 8/1989 | Moteki . |
| 4,921,552 | 5/1990 | Sander et al. . |
| 4,973,359 | 11/1990 | Yamascoe . |
| 5,026,440 | 6/1991 | Finnenthal et al. . |
| 5,064,468 | 11/1991 | Okai et al. . |
| 5,082,698 | 1/1992 | Anderson et al. . |
| 5,085,696 | 2/1992 | Muller et al. . |
| 5,126,382 | 6/1992 | Hollenberg ............................... 525/57 |
| 5,129,967 | 7/1992 | Sander et al. . |
| 5,158,622 | 10/1992 | Reichgott et al. . |
| 5,281,282 | 1/1994 | Dolan et al. . |
| 5,282,905 | 2/1994 | Reichgott ............................... 148/247 |
| 5,356,490 | 10/1994 | Dolan et al. . |
| 5,534,082 | 7/1996 | Dollman et al. . |

FOREIGN PATENT DOCUMENTS

| | | |
|---|---|---|
| 27 49 691 | 5/1979 | Germany . |
| 50-144639 | 11/1975 | Japan . |
| 51-075730 | 6/1976 | Japan . |
| 59-225951 | 12/1984 | Japan . |
| WO 85/05131 | 11/1985 | WIPO . |

OTHER PUBLICATIONS

Product Literature of Air Products and Chemicals, Inc. 1992.
Product Literature of Magnesium Elektron, Inc.
07/404,333, Williams (now abandoned).
Exhibit A ("Report to Management") to the Request for Reexamination of U.S. Pat. No. 4,191,596 (Reexamination No. 90/001,690).
Supplemental European Search Report dated Feb. 19, 1997.

*Primary Examiner*—David Buttner
*Attorney, Agent, or Firm*—Ratner & Prestia

[57] ABSTRACT

A method and composition for coating a metal for use in connection with improving corrosion resistance and paint adhesion. The composition is a non-corrosive ester cross-linked polymer system having a plurality of carboxylic functional groups and a plurality of hydroxyl groups. The polymer system may be a bifunctional copolymer or the reaction product of a first polymer having a plurality of carboxylic functional groups (e.g. polyacrylic acid or polymethylvinylmaleic anhydride), and a second polymer having a plurality of hydroxyl groups (e.g. polyvinyl alcohol). The resulting reaction product of these two polymers is a cross-linked polymeric blend. A compound of a Group IV-B element may be added to this polymer blend to increase the degree of cross-linking and improve paint adhesion and corrosion resistance. Such a Group IV-B compound may be an acid such as fluozirconic acid, fluotitanic acid or fluchafnic acid, or a salt such as ammonium zirconium carbonate. The method for improving corrosion resistance and paint adhesion of a metal surface includes contacting the metal surface with a composition of the present invention and drying the composition in place. Prior to contacting the metal surface with such a composition, the metal surface may be cleaned and rinsed.

28 Claims, 3 Drawing Sheets

METHOD AND COMPOSITION FOR TREATING METAL SURFACES

This application is a continuation of application Ser. No. 08/112,890, filed Aug. 27, 1993 (status: abandoned), which is a continuation-in-part of application Ser. No. 07/982,874, filed Nov. 30, 1992 now abandoned.

FIELD OF THE INVENTION

This invention relates to methods and compositions for treating metal surfaces in order to improve both corrosion resistance and paint adhesion.

BACKGROUND OF THE INVENTION

Known methods of treating metal surfaces to improve adhesion and corrosion resistance of the painted metal surfaces make use of two general definable classes of chemistries. The first class is based on the traditional conversion coating types of chemistries such as zinc phosphate, iron phosphates, chromium chromate, chromium phosphate, etc. The second class is based on more recent developments in the metal pretreatment industry and are characterized by what is now referred to as dried-in-place technology. The traditional conversion coating chemistries require rinsing of the metal substrate to remove applied conversion coating solution. Dried-in-place chemistries require that the applied solutions be dried on the metal substrate to which they are applied. Thus, they are described as dried-in-place. Thus, the class of traditional conversion coatings have as their major drawback the requirement of rinsing. Regardless of the chemistry involved, they require the use of large volumes of water to rinse.

The advantage in the dried-in-place class of chemicals is therefore obvious in that no rinsing is required. Thus, the traditional conversion coatings class of pretreatments are characterized by steps or process stages that include:

1) Cleaning—by use of an alkaline or acid cleaning solution,
2) Rinsing—to remove residual cleaning solution,
3) Pretreatment—with the traditional conversion coating solution,
4) Rinsing—to remove the residual pretreatment solution, and optionally
5) a final rinse with a corrosion resistance enhancing material such as chromate.

The traditional coatings class of materials are therefore often referred to as five stage conversion coatings.

The second class of materials, the dried-in-place class, are typically referred to as three stage processes since their process steps are typically:

1) Clean—by use of an alkaline or acid cleaning solution,
2) Rinse—to remove residual cleaning solution, and
3) Application of the dried-in-place pretreatment solution.

Another significant disadvantage of the traditional conversion coatings class is the fact that the rinse water is polluted and requires waste treatment. This adds significantly to the cost of the process since significant capital equipment and liability go along with waste handling and treatment.

There are also chemistries in both classes that have other major drawbacks. These particular chemistries are based on chromium compounds, which show toxicological properties and have been determined by the Environmental Protection Agency and by the Occupational Safety and Health Agency as a risk to the environment and health. Moreover, chemistries based on hexavalent chromium are classified as carcinogens by these agencies.

Attempts have been made to produce chromium-free dried-in-place coatings. In the case of aluminum extrusions, successful replacement of chromium was partially accomplished by use of a fluo acid and a carboxylic polymer, as disclosed in U.S. Pat. No. 4,191,596 to Dollman et al. The following formulas applied to clean aluminum extrusions at a concentration of 1% (by weight) of each in water will produce a coating that falls under this technology:

TABLE 1

| Compound 1 | % Wt. | Compound 2 | % Wt. |
|---|---|---|---|
| Poly(acrylic acid) | 5.0 | Hydrofluozirconic Acid | 7.4 |
| Water | 95.0 | Hydrofluoric Acid | 0.3 |
|  |  | Water | 92.3 |

Aluminum samples treated by such a composition have acceptable paint adhesive properties in the dry state. However, the ability to pass other requirements of the American Architectural Manufacturer's Association (AAMA) specifications are somewhat questionable. The twenty minute cross-hatch boiling water test has variable results. The 1,000 hour test in 100 relative humidity is inconsistent. In addition, neutral salt spray corrosion resistance is not good.

Another method has been introduced for aluminum extrusions. In this method, the following polymer solution along with a fluo acid is applied to an aluminum surface:

TABLE 2

| Compound | % Wt. |
|---|---|
| Poly(acrylic acid) | 3.75 |
| Ammonium Bifluoride | 0.10 |
| Fluosurfactant | 0.04 |
| Water | 96.11 |

Although this method does not require chromium, it does require different process steps and requires an increase in the number of process steps. Comparing this method with a traditional conversion coating method, the step of treating the metal surface with a conversion coating solution is replaced with an acid cleaning stage, then water rinse, followed by dried-in-place pre-treatment which requires a stainless steel or acid-resistant section. In this method, the following steps are required to treat the metal surface: (1) cleaning the metal surface with an alkaline or acid bath; (2) rinsing the cleaned metal surface with water; (3) cleaning the metal surface with an acid solution; (4) rinsing the metal surface with water; and (5) pretreating the rinsed metal surface with a modified chrome-free solution, such as in Table 2 above. Thus, this method can be referred to as a "five-step, chromium-free, dried-in-place method." As in all methods, these steps are followed by drying and then painting the metal surface.

Nonetheless, there remains a need for a chromium-free coating composition which is capable of improving paint adhesion and corrosion resistance by employing the more convenient, three step dried-in-place method. In addition, there remains a need for such a composition which can improve paint adhesion and corrosion resistance of a variety of metals, not exclusively aluminum and aluminum alloys.

Further, there is a need for a coating composition having a relatively high concentration of constituents to meet application requirements such as some reverse-roll coating systems. Also, from an operational standpoint, a single package system including both the inorganic components and organic components is desirable. Thus, a single package material showing no instability or gelation is necessary.

SUMMARY OF THE INVENTION

The present invention is an aqueous, chromium-free ester cross-linked polymer system, which may be used in connection with improving paint adhesion and corrosion resistance for a variety of metals by the dried-in-place method. The aqueous ester cross-linked polymer system of the present invention may comprise the reaction product, or blend, of a first polymer having a plurality of carboxylic functional groups and a second polymer having a plurality of hydroxyl groups. The first polymer and the second polymer may be added in a ratio of equivalents of carboxylic functional groups to hydroxyl functional groups in the range of 0.3:1.0 to 3.5:1.0. The concentration of the first polymer may be in the range of 0.03 to 0.9 grams/liter and the concentration of the second polymer may be in the range of 0.01 to 0.6 grams/liter. The first polymer may be selected from the group consisting of polyacrylic acid, polymethylvinyl-maleic anhydride or other polycarboxylic containing polymers. The second polymer may be polyvinyl alcohol or other alcohol functional polymers.

According to an alternative embodiment of the present invention, ester cross-linked polymer system comprises a bifunctional copolymer having carboxylic and hydroxyl functionality. Each polymer chain of such a copolymer includes both carboxylic and hydroxyl functional groups. The ratio of equivalents of carboxylic functional groups to hydroxyl functional groups should also be in the range of 0.3:1.0 to 3.5:1.0.

According to a preferred embodiment of the present invention, after formation of the ester cross-linked polymer system, it is combined with a compound of a Group IV-B element. This compound of a Group IV-B element may be selected from the group consisting of fluozirconic acid, fluotitanic acid and fluohafnic acid. Alternatively, the compound of the Group IV-B element may be a salt, such as ammonium zirconium carbonate.

According to a more specific preferred embodiment of the present invention, the ester cross-linked polymer system includes the reaction product, or polymeric blend, of from about 0.03 to 0.9 grams/liter of polyacrylic acid and from about: 0.01 to 0.6 grams/liter is of polyvinyl alcohol, and is mixed with from about 0.9 to 3.0 grams/liter of fluozirconic acid. With the addition of ammonia, the composition may include up to 22.68 grams/liter of polyacrylic acid, up to 14.52 grams/liter of polyvinyl alcohol, and up to 73.45 grams/liter of fluozirconic acid.

The present invention also includes a method for treating a metal surface to improve paint adhesion and corrosion resistance comprising contacting a metal surface with an ester cross-linked polymer system, such as a polymeric blend or bifunctional copolymer of the present invention.

The method of the present invention may include treating a metal surface to improve paint adhesion and corrosion resistance, including first cleaning the metal surface, such as with an alkaline spray to form a cleaned metal surface. Then, the cleaned metal surface is rinsed with water to form a rinsed metal surface. Then, the rinsed metal surface is contacted with an aqueous solution of the present invention, including the ester cross-linked polymer system and a compound from a Group IV-B element. Alternatively, the metal surface, previously contacted with the aqueous solution, is then dried by evaporation to form a dried, coated metal surface, and the dried metal surface is painted.

BRIEF DESCRIPTION OF THE DRAWING

The invention is best understood from the following detailed description, when read in connection with the accompanying drawing, in which.

DETAILED DESCRIPTION OF THE INVENTION

Figures 1A, 1B, 1C:
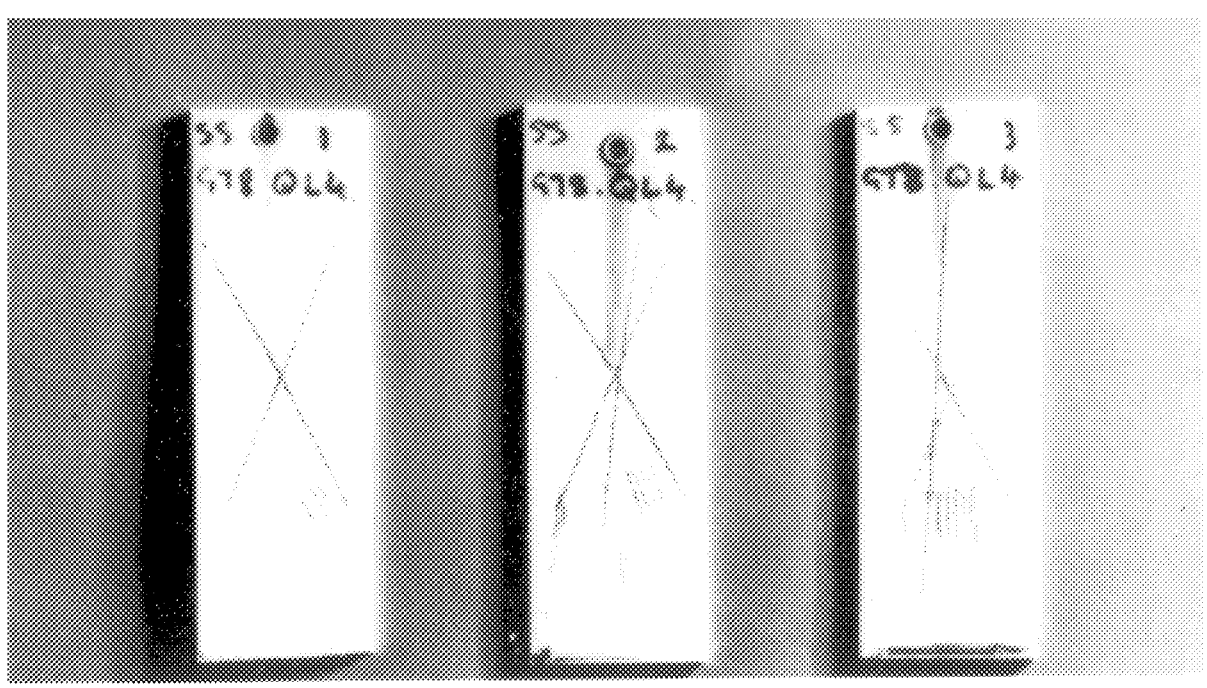
FIGS. 1(a), 1(b) and 1(c) are photographs of samples of metal surfaces treated by: (a) the traditional chromium-free method; (b) a composition of the present invention; and (c) a traditional chromium phosphate, respectively, after each sample has undergone 25 hours of the Pressure Cooker Permeability Test.

The ester cross-linked polymer system may be either a bifunctional copolymer or the reaction product of a first polymer having carboxylic functional groups (—COOH) and a second polymer having hydroxyl functional groups (—OH). In order to obtain the reaction product, or polymeric blend, of the present invention, the two polymers are reacted. The first polymer may be polyacrylic acid or polymethylvinylmaleic anhydride. The second polymer reactant may be polyvinyl alcohol. The resulting polymeric blend is a cross-linked polymer having some free, or unreacted, carboxylic acid groups and hydroxyl groups on the various polymer chains.

The operable grades of polymer reactants vary over a wide range. Experiments have been successful with compositions using polyvinyl alcohols having a medium viscosity grade (molecular weight average of 85,000–146,000) and an ultra-low viscosity grade (molecular weight average of 13,000–23,000). Similarly, successful experiments have been performed with compositions using a first polymer reactant having a molecular weight on the order of 60,000. Although experimentation with different grades of reactant polymers have not been performed, it is believed that all grades of reactant polymers will perform satisfactorily.

The method of preparing a polymeric blend suitable for use in this invention is well known in the art, even though it has not been previously known to use such a blend for improving paint adhesion and corrosion resistance. A discussion of the relevant chemical reactions is helpful to explain how the polymeric blend of the present invention is made. In a simple esterification reaction, an alcohol reacts with a carboxylic acid to form an ester and water by the following reaction:

$$R\text{—}OH + R'\text{—}COOH \leftrightarrows R\text{—}O\text{—}CO\text{—}R' + H_2O \qquad (1)$$

This reaction is reversible and will react until an equilibrium is reached.

The rate of ester formation is affected by well-known factors such as the relative concentrations of the reactants, acid/base catalysis, and mass action principles. Also, the formation of ester is subject to the steric hindrance effects due to: (1) the nature of the polymer strands (including the degree of coiling and the distance between functional groups and the like) and (2) the types of alcohol and acid, either primary, secondary and tertiary. The preferred materials for this invention are polyvinyl alcohol, a secondary alcohol, and polyacrylic acid, a secondary acid.

With the application of heat in esterification reaction (1), water is driven off, which causes the equilibrium of reaction 1 to shift to the right as shown below:

$$R\text{—}OH + R'COOH \rightarrow R\text{—}O\text{—}CO\text{—}R' + H_2O\uparrow$$

As water is driven off, the reaction becomes substantially irreversible, and the alcohol and carboxylic acid continue to form an ester.

A polyacrylic acid is a polymeric chain having a series of carboxylic acid functional groups (—COOH). Reacting polyacrylic acid with a non-polymer alcohol forms a three-dimensional, short range polymeric chain with ester groups and water. The reaction is reversible.

Polyvinyl alcohol is a polymeric chain having a series of hydroxyl groups (—OH). Reacting polyvinyl alcohol with a simple, non-polymer acid forms a three-dimensional, short-range polymeric chain having a plurality of ester groups. This reaction is also reversible. In this context, three-dimensional, short-range polymers are polymers of limited chain length with little or no cross-linking.

Only by mixing the two polymer reactants of the present invention can a three-dimensional, long-range polymeric network be formed. In this reversible reaction, polyacrylic acid and polyvinyl alcohol react to form a polymeric blend and water. The polymeric blend is cross-linked by ester formation. However, not all of the carboxylic acid functional groups and the hydroxyl groups react in this way to serve to cross-link the polymer chains and form water. In fact, it is believed that the degree of cross-linking is small compared to the potential for ester formation based on the amount of hydroxyl and carboxyl functionality available, so that many of the carboxylic groups and hydroxyl groups remain free on the polymeric chains.

For the metal samples tested to date, it has been determined that the polymeric blend alone is not the most effective embodiment of the present invention to improve paint adhesion and corrosion resistance. It appears that there is not as much interaction with the metal surface for the polymeric blend alone to be as effective as the preferred embodiment. In addition, the degree of cross-linking appears to be too low. The degree of cross-linking can be increased, however, by adding heat to drive off water during the reaction. Therefore, in some conditions, the polymeric blend alone may be sufficient. Nevertheless, the preferred embodiment is the polymeric blend combined with an additional reactant, which increases the degree of cross-linking and which causes increased interaction between the composition and the metal surface.

The conditions and details above also hold for bifunctional copolymers having a bifunctionality of carboxylic and hydroxyl groups. In this embodiment, unlike in the polymeric blend, there will also be some intra chain interaction as well as the expected inter chain interaction. It is possible to form such copolymers by many well-known polymer synthesis pathways, such as:

(1) Free radical polymerization of unsaturated monomers that produce a hydroxyl and carboxyl functional copolymer or a copolymer that may be hydrolyzed to yield free hydroxyl and carboxyl functionality;

(2) Partial reduction of a poly-carboxylic acid to form hydroxyl functionality on the same chain. This partially reduced material can be made into a water soluble ester cross-linked polymer system by intra chain bonding and inter chain cross-linking; or (3) Partial oxidation of an appropriate polymer alcohol to produce carboxylic groups on the same polymer chain as hydroxyl groups.

A free radical polymerization of a hydroxy-ethyl methacrylate and methacrylic acid monomers were used to produce such a copolymer. This material, —($CH_2$—C($CH_3$)COOH) —($CH_2$—C($CH_3$)COOCH$_2$CH$_2$OH)— was tested and found to provide results similar to those of the blend of the two polymers.

As mentioned above, the ester cross-linked polymer system preferably includes an additional reactant. Such an additional reactant is a compound from an element of Group IV-B of the periodic table. In this embodiment of the invention, the first and second polymers are mixed and permitted to react to form the polymeric blend (or a copolymer is prepared), then the additional reactant is added to the polymer system. The term "Group IV-B compound" is meant as either an acid or a salt of a Group IV-B element. Such acids include hydrofluozirconic acid ($H_2ZrF_6$), fluotitanic acid ($H_2TiF_6$) and fluohafnic acid ($H_2HfF_6$). The fluo acids actually used in the experiments which generated the Examples below were not entirely pure. In particular, the hydrofluozirconic acid solution used, available from Cabot Corporation, actually contains about 2% (by weight) of hydrofluoric acid, and the fluotitanic acid solution used, available from M & T Harshaw, actually contains 0.5% (by weight) of hydrofluoric acid.

A salt of a Group IV-B element which has been used successfully is ammonium zirconium carbonate. An ammonium zirconium carbonate solution sold by Magnesium Elektron Inc. under the trademark BACOTE 20, having a working empirical formula of $(NH_4)_2[Zr(OH)_2(CO_3)_2] + n\ H_2O$, was used in several tests.

From completed tests, it appears that the Group IV-B element, such as zirconium, increases the interaction between the composition and the metal surface. In effect, the Group IV-B element helps to bond the composition with the metal surface. In addition, adding a Group IV-B compound (i.e., a Group IV-B acid or salt) increases the degree of cross-linking in the polymeric blend.

The amount of the first and second polymers utilized, and the relative concentrations of the reactants which form the polymeric blend, can vary over a wide range. The operable ratio of the first polymer to the second polymer can be expressed as the ratio of carboxylic acid functional groups of the first polymer to hydroxyl functional groups of the second polymer. The range of the functional group equivalents has been found to be 0.3:1 to 3.5:1. (This range also applies for the copolymer). This may be the most accurate way to express the ratio of the two polymer reactants, because the properties of the composition as a paint bonding composition are primarily determined by the number of equivalents of the carboxylic functional groups and the hydroxyl functional groups.

The amount of polymeric material present in the solution must be sufficient to aid in the forming of a film on the metal surface. The amount of polymer present should be that amount which will be particularly effective under the particular operating conditions of the treating process, so as to improve the corrosion resistant abilities and binding properties of the coating. In an embodiment of the invention, it has been found that the concentration of the first polymer should be in the range of 0.03 to 0.9 grams/liter, and the concentration of the second polymer should be in the range of from 0.01 to 0.6 grams per liter.

For aluminum extrusions, a composition including about 0.23 grams/liter of polyacrylic acid and about 0.15 grams/liter of polyvinyl alcohol is a preferred embodiment. These concentrations correspond to a 1:1 ratio of equivalents of carboxylic functional groups to hydroxyl functional groups. Similarly, for coil coating applications, a composition including about 0.46 grams/liter of polyacrylic acid and about 0.29 grams/liter of polyvinyl alcohol is a preferred embodiment. These concentrations also correspond to a 1:1 ratio of equivalents of carboxylic functional groups to hydroxyl functional groups. In addition, it has been found that the Group IV-B compound should be added in an amount from 0.7 to 3.0 grams per liter. For aluminum extrusions, a composition including about 0.78 grams/liter of the Group IV-B compound is a preferred embodiment. For coil coating applications, a composition including about 1.56 grams/liter of the Group IV-B compound is a preferred embodiment. The concentrations provided above depend on a number of process parameters, such as line speed and temperature.

Another way of determining the concentration ranges is dependant on the solubility of the various components. At concentrations too low, there is insufficient coating to cover the metal surface. Above the solubility limits, the polymers begin to come out of the solution.

In all embodiments discussed above, it is advantageous to keep the ester cross-linked polymer system blend separate from the Group IV-B acid or salt until shortly before use. The reason for this is that after these components are mixed, the product becomes somewhat unstable. However, it has been found that by increasing the pH of the product, the polymer system can be mixed with the Group IV-B acid or salt several months before actual use. In this way, a single package can be sold to consumers. Also, it has been found that by increasing the pH, higher concentrations of the components can be achieved without insolubilization.

In order to obtain such a "single package" material, the pH of the solution should be adjusted to within the range of 2.8 to 4.8. On the other hand, the pH of the composition of the ester cross-linked polymer system and the Group IV-B acid, prior to adjustment, is within the range of about 1.2 to 2.8. The pH of the composition of the ester cross-linked polymer system and ammonium zirconium carbonate, prior to adjustment, is within the range of about 7.5 to 9.0.

Increasing the pH inhibits esterification, so not as much cross-linking takes place. By limiting the degree of cross-linking, the solution will remain clear even though a greater amount of the ester cross-linked polymer system and the Group IV-B acid or salt have been added. The addition of ammonia is particularly useful for the above-mentioned reverse roll coating system which require higher concentrations of components.

With the addition of ammonia, it has been found that the concentration of the first polymer can be as high as 22.68 grams/liter, the concentration of the second polymer can be as high as 14.52 grams/liter, and the concentration of fluozirconic acid can be as high as 73.45 grams/liter Because ammonia is the most volatile reactant, after coating a metal surface and applying heat, the ammonia volatilizes thereby permitting the esterification reaction between the two reactants to proceed.

This single package material was tested and compared to the other two package systems. The results were equal.

Further, it is believed that this single package material will show better application pan stability. Field work has shown that there is some ester cross-linked polymer system drop out in the application pan in roll coat operations when using the two package system.

In a composition of the present invention including the polymeric blend and a Group IV-B acid solution, the total weight percent of polyacrylic acid and polyvinyl alcohol should not exceed 0.15% (by weight) in a solution without ammonia. When the total weight percent of these two compounds does exceed 0.15% in a solution without ammonia, the solution becomes cloudy. This is an undesirable effect and also decreases the efficiency of the composition as a paint bonding composition. In solutions with ammonia, clear solutions have been attained having a total weight percent of polyacrylic acid and polyvinyl alcohol as high as 7.48% (by weight). It may be possible to achieve an even higher total weight percent of these two compounds by using more ammonia or a higher strength ammonia solution. This effect of ammonia has been tested with solutions including the polymeric blend and fluotitanic acid (See Example 10 below), ammonium zirconium carbonate, and fluozirconic acid. The highest concentrations are most easily obtained by selecting fluozirconic acid as the Group IV-B acid or salt. With fluotitanic acid, it was difficult to achieve a clear solution at the high concentrations but a clear solution was attainable after some mixing. It is believed that the same effect would occur if fluohafnic acid were selected as the Group IV-B element. Thus, the upper end of the operable concentrations of the polymer reactants is the point at which the polymer reactants become insoluble.

The methods and compositions of the present invention are capable of treating a wide variety of metals to improve paint adhesion and corrosion resistance. These metals include aluminum and aluminum alloys, zinc and zinc alloys, iron and iron alloys, and combinations thereof.

Regardless of the particular metal, the method is the same, although the particular compositions may vary slightly with different metals to achieve the best is results. Initially, the metal surface is cleaned. The cleaning step can be carried out by any conventional method, such as a conventional alkaline cleaner or an acid cleaner. The cleaning solution may be sprayed onto the metal surface, or the metal surface may be dipped in a bath of the cleaning solution. If the metal surface is heavily soiled, a detergent cleaner additive may be included in the cleaning step.

Next, the cleaned metal surface is rinsed with water to form a rinsed metal surface. This rinsing step removes any excess cleaner or detergent left on the metal surface from the cleaning step.

After the metal surface is rinsed, the rinsed metal surface is treated with an aqueous composition of the present invention. The coating process can be effected by employing any of the coating techniques known in the art. Contact can be effected by spray, immersion or flow coating techniques. The amount of coating should be sufficient to leave from about 3.0 to 40.0 milligrams of the dried coating per each square foot of dried metal surface. By using a solution of higher concentrations (which can be achieved by the addition of ammonia), it is possible to leave this amount of the dried coating with less solution.

As mentioned above, one well known coating technique is reverse roll coating, whereby a sheet of metal is pulled between counter-rotating cylinders, which are rotating against the direction of travel of the sheet being unrolled. The solution is rolled down along these cylinders until it contacts the metal. As the sheet metal is passed between the cylinders in a direction against the direction of rotation of the cylinders, some wiping force is applied to the metal. Another conventional method is known as the quick-dip method, whereby sheet metal is dipped in a solution of the coating composition and is subsequently passed between two rolls to remove the excess.

The process can be operated at a wide range of temperatures. The process has been carried out at temperatures from about 60° F. to 150° F., although there is no reason to believe that temperatures outside of this range will prevent the composition from having the desirable effects. Generally, a slight change in the temperature will not necessitate substantial alteration of the treating time, or concentrations or ratios of reactants.

The time of treatment of a metal surface with the aqueous composition need only be long enough to ensure complete wetting of the surface. The contact time between a substrate and solution should be from approximately less than one second to about one minute.

Following application of the aqueous composition, the surface is subjected to a drying operation. The surface is dried by evaporation, and the temperatures for the drying operation may range from about 60° F. to about 500° F. The length of the drying step will depend upon the temperature utilized. In addition, air may be blown over the surface to enhance the evaporation.

For ferrous alloys, if there is a significant time lapse (e.g. at least one or two minutes) between the application and the drying steps, a small amount of any well-known corrosion inhibiting compound should be added to the solution. Such compounds, including sodium nitrite, ammonium molybdate and other corrosion inhibiting compounds, provide flash rusting protection. Flash rusting is a particular problem where ferrous alloys are pretreated but are not quickly dried after pretreatment application. The use of these additives has served to inhibit flash rust production until the drying process is completed.

After drying the metal surface, the metal surface is painted or coated with a lacquer. The dried-in-place composition of the present invention serves to adhere the paint or lacquer to the metal surface and minimize corrosion.

In the continuous coating operation, where a coating bath is physically located under passing metal, it is important to properly replenish the composition in order to maintain the effectiveness of the coating process. The ingredients comprising the composition are depleted as a result of reactions which occur during the formation of the coating. Available fluoride is consumed as a result of completing with metal (i.e., a "used" coating bath may contain from about 0.005 to about 20 grams/liter or higher of metal ion), while acidicity is consumed as the metal surface is coated.

The coating solution should be replenished if the ingredients are depleted. This may be accomplished by monitoring the amount of each ingredient in the coating solution and adding this ingredient as it is depleted. Alternatively, the replenishment can be accomplished by estimating the depletion and adding to the coating bath a predetermined amount of the ingredients at a predetermined time.

The methods and compositions of this invention can be applied in a wide variety of applications. These applications include extrusion applications and coil coating.

An extrusion process is an operation in which a material is forced through a metal forming die, followed by cooling or chemical hardening. As indicated by the Examples below, the methods and compositions of the present invention are effective in improving paint adhesion and corrosion resistance of metals which were extruded.

In coil coating, a roll of metal is unwound, sequentially and continuously cleaned, treated and decorated (i.e., painted and baked). Painted stock is rewrapped and then used to create articles. Articles formed from this prepainted coil obviously do not require further painting and baking. Thus, a convenient and economic means for producing articles is achieved. It has been found that polymer reactants of slightly higher molecular weight are preferred for a coil coating application than those for an extrusion process.

Because the prepainted coil must be cut, bent, impacted, and shaped into a desired article, the adhesion of the paint to a metal is important. Measures of the paint adhesion include T-bends, impact, crosshatch, and cross-hatch reverse impact.

Further, corrosion resistance can be of importance since an article produced from painted coil can be required to perform in severe weather. Articles such as siding and rainwear (e.g., gutters and spouts) are some examples. Corrosion performance specifications for these types of articles include boiling water, condensing humidity, salt fog, and mildew resistance. Samples of metals which have been coil coated are described in the Examples below.

EXAMPLES

The following examples are included to more clearly demonstrate the overall nature of the invention. These examples are comparative, not representative, of the invention. Examples 1 and 9 are set forth for the purpose of illustrating the preparation of aqueous compositions of the present invention and conventional methods. Examples 2 through 8 and 10 illustrate the improved results obtained by employing aqueous compositions of this invention.

Example 1

To obtain a bath of the composition of the present invention, the concentration of the ingredients of the composition are diluted. For example, distilled water may be first mixed with polyacrylic acid and polyvinyl alcohol to form a polymeric blend. Then, fluozirconic acid is added to the polymeric blend. The components are added in an amount sufficient to achieve final concentrations of: 0.03 to 0.9 grams per liter of polyacrylic acid; 0.01 to 0.6 grams per liter of polyvinyl alcohol; and 0.7 to 3.0 grams/liter of fluozirconic acid, in a solution without ammonia. The final composition may also contain some hydrofluoric acid or some free fluoride.

To determine the concentration limits of the constituents of the composition of the present invention, solutions of the present invention were blended in varying amounts of the constituents.

Also, known compositions were prepared. For example, 20 mls. of a polyacrylic acid solution sold under the trademark ACUMER 1510, an aqueous solution comprising polyacrylic acid, manufactured by Rohm & Haas Co. was mixed with 20 mls. of commercially available fluozirconic acid. The resulting solution was clear.

A second comparative solution was obtained by mixing 20 mls. of IV-42-A with 20 mls. of fluozirconic acid mentioned above. Compound IV-42-A includes the following constituents in the following percentages:

TABLE 3

| | Weight Percent | Volume Percent |
|---|---|---|
| Distilled Water | 94.9 | 94.9 |
| AIRVOL 125 | 5.0 | 3.876 |
| KATHON LX | 0.1 | — |
| Total | 100.0 | 98.77 |

As shown, the compound IV-42-A includes a polyvinyl alcohol sold under the trademark AIRVOL 125, manufactured by Air Products & Chemicals, Inc. and a biocide, which prevents fungal and bacterial growth, sold under the trademark KATHON LX by Rohm & Haas. A clear solution resulted.

Next, a composition of the present invention was prepared by mixing 20 mls. of a polymeric blend of the present invention (shown in Table 4) with 20 mls. of the hydrofluozirconic acid solution shown in Table 1, compound 2. A sludge formed immediately, indicating the formation of reaction products.

In order to obtain a clear solution of a concentration of the present invention, the formulation was diluted with distilled water. First, 10 mls. of the polymeric blend and 10 mls. of the fluozirconic acid solution were added to 20 mls. of distilled water and mixed with a stirrer. Still, a cloudy solution resulted.

Next, 5 mls. of the polymeric blend and 5 mls. of the fluozirconic acid solution were added to 30 mls. of distilled water. This resulted in a composition having 12.5% (by volume) of each of the polymeric blend and the fluozirconic acid solution. Still, the solution was cloudy after mixing.

Next, 2.5 mls. of the polymeric blend and 2.5 mls. of the hydrofluozirconic acid solution were added to 35 mls. of distilled water. This resulted a composition having 6.25% (by volume) of each of the polymeric blend and the acid solution. The resulting solution was turbid after mixing.

Next, 4 mls. of the polymeric blend and 4 mls of the hydrofluozirconic acid solution were added to 92 mls. of distilled water. This resulted in a formulation having 4% (by volume) of the polymeric blend and 4% (by volume) of the hydrofluozirconic acid solution. The resulting solution was very slightly cloudy after mixing.

Finally, 2.5 mls. of the polymeric blend and 2.5 mls. of the hydrofluozirconic acid solution were added to 95 mls. of distilled water. This resulted in a formulation having 2.5% (by volume) of the polymeric blend and 2.5% (by volume) of hydrofluozirconic acid solution. The resulting solution was clear after mixing.

Example 2

Three identical samples of extruded aluminum were employed in this procedure. The first sample, sample (a), was exposed to the five-stage, chromium-free method as referred to in the background portion of the application. The second sample, sample (b), was treated to a formulation of the present invention, namely the hydrofluozirconic acid solution of Table 1, compound 2, and the following polymeric blend:

TABLE 4

| Component | Wt. % |
|---|---|
| polyvinyl alcohol | 1.46 |
| polyacrylic acid | 2.28 |
| ammonium bifluoride | 0.05 |
| fluosurfactant | 0.04 |
| water | 96.17 |

The fluosurfactant is an optional additive. The third sample, sample (c), was exposed to a traditional chromium phosphate as discussed in the background portion. All of these samples were then painted with a powder paint and then baked.

Each sample was subjected to the pressure cooker permeability test. In this test, the samples are placed in a pressure cooker of distilled water at a pressure of 15 psi and a temperature of 250° F. Prior to placement in the pressure cooker, the samples are scored with a cutting device (as shown by an "X" in FIGS. 1(a), 1(b) and 1(c)). After a certain amount of time, the samples are removed and visually inspected for blistering.

As shown in FIGS. 1(a), 1(b) and 1(c) and FIG. 3, there is no significantly visible difference between the two non-chrome systems, samples (a) and (b). At twenty-three hours, both of these samples were blister-free, and at twenty-five hours, each displayed some discernible slight blistering.

The test on the standard chrome sample (c) was discontinued at twenty-five hours with still no evidence of visible blistering at all, nor loss of adhesion. Despite some measurable difference between sample (b) of the present invention and sample (c), this is, nevertheless, an encouraging result, because many other tests on other non-chrome alternatives failed much earlier than sample (b) of the present invention.

Example 3

Figures 2A, 2B, 2C:
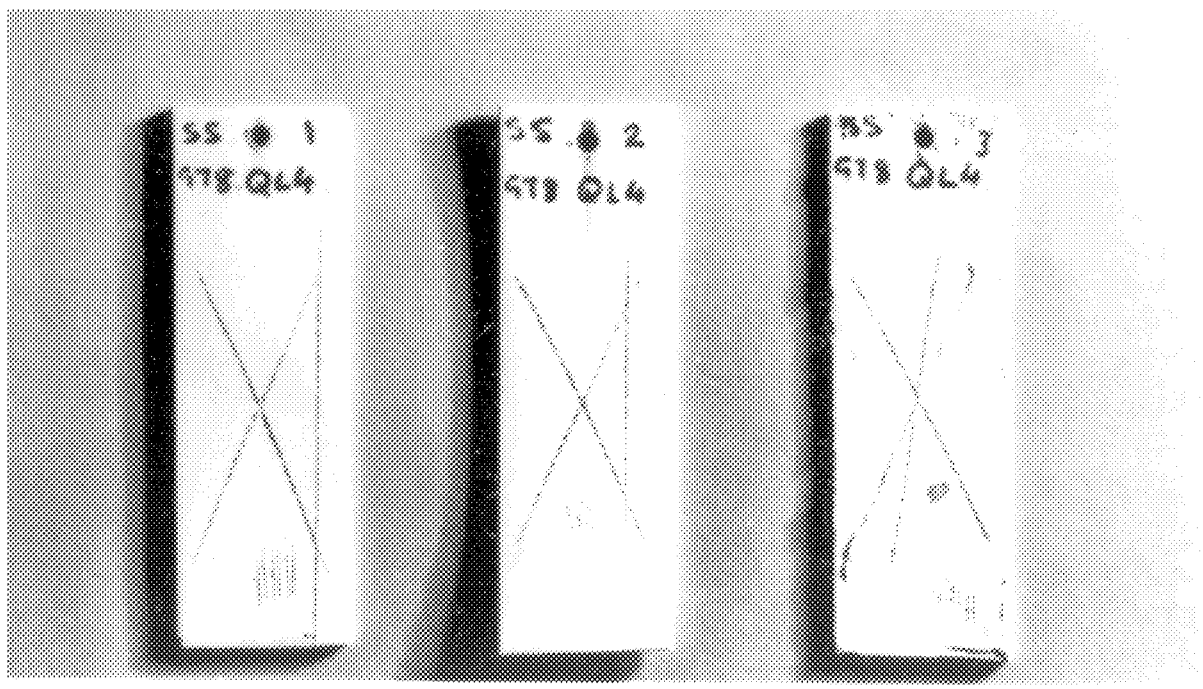
FIGS. 2(a), 2(b) and 2(c) are photographs of samples of metal surfaces treated by: (a) the traditional chromium-free method; (b) a composition of the present invention; and (c) a traditional chromium phosphate, respectively, after each sample has undergone 8,000 hours of the Acetic Acid Salt Spray Test.
Figure 3:
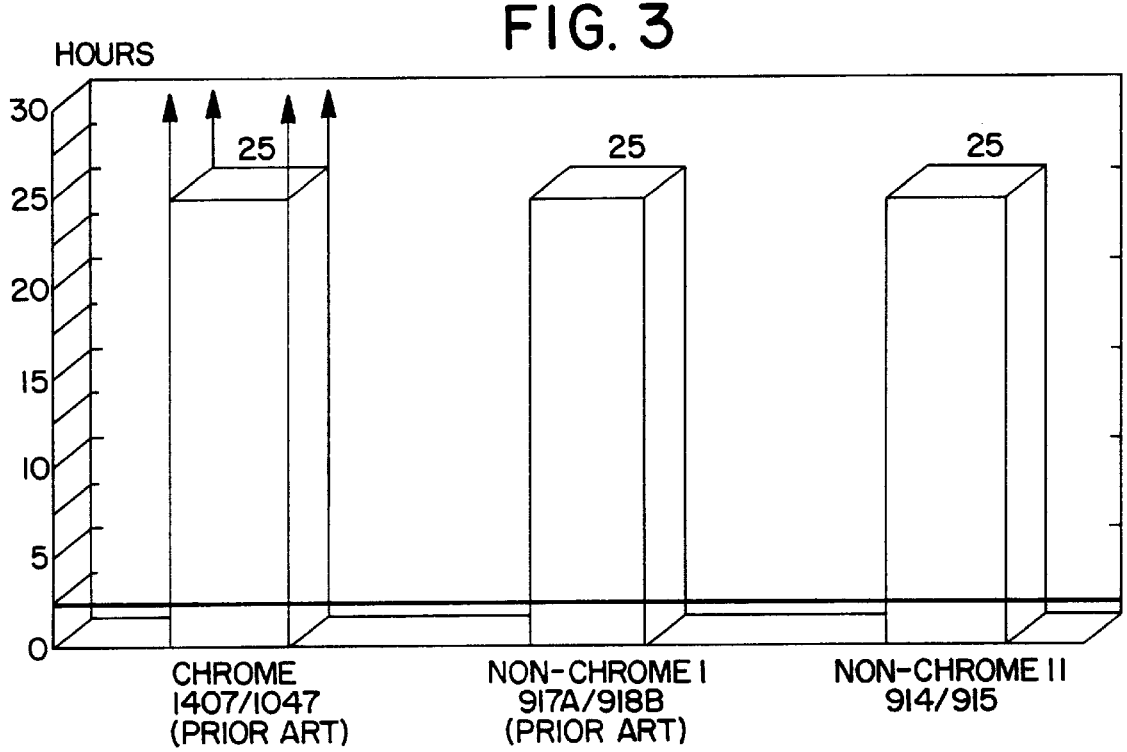
FIG. 3 is a bar graph showing the hours to blistering failure during the Pressure Cooker Permeability Test for the samples referred to in FIGS. 1(a), 1(b) and 1(c)
Figure 4:
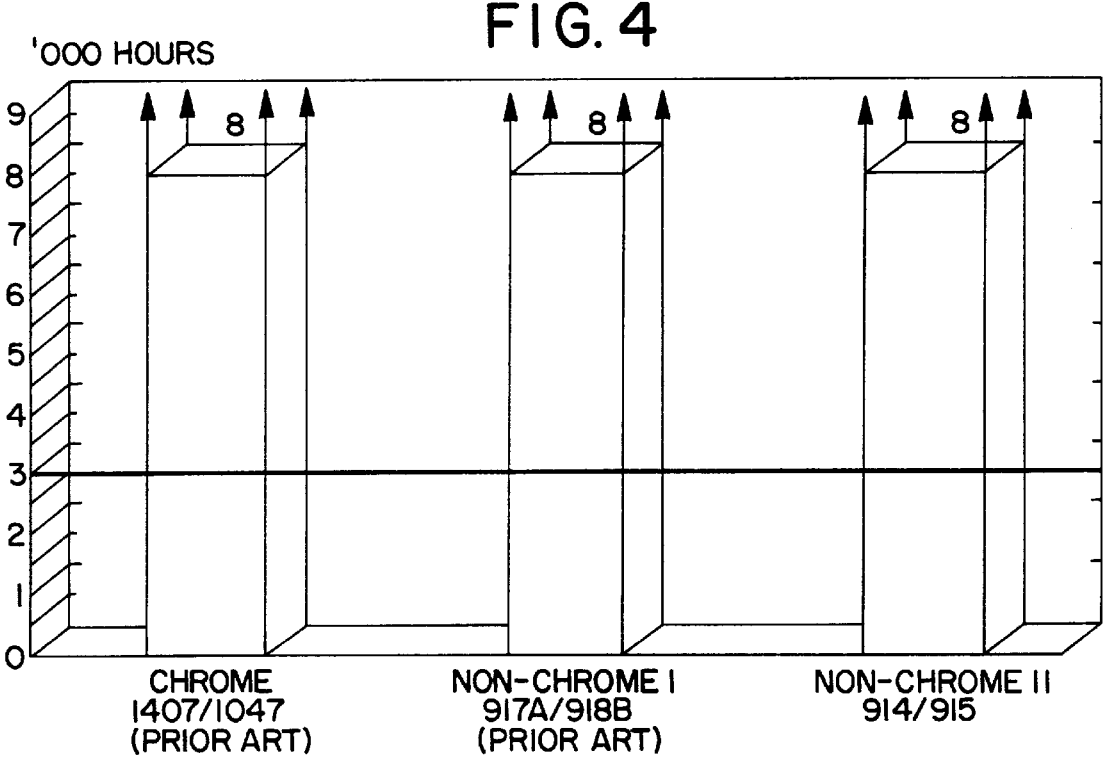
FIG. 4 is a bar graph showing the hours to blistering failure during the Acetic Acid Salt Spray Test for the samples referred to in FIGS. 2(a), 2(b) and 2(c).

In order to demonstrate the improved paint adhesion and corrosion resistance properties of a metal treated by a composition of the present invention, a similar experiment as that of Example 2 was run on three more samples (a) through (c), except that the acetic acid salt spray test was used in place of the pressure cooker permeability test. In the acetic acid salt spray test conducted in accordance with ASTM B117, the samples are exposed to atomized salt spray having acetic acid. The samples are similarly scored with an "X", as shown in FIGS. 2(a), 2(b) and 2(c).

Tests on all three samples were discontinued at 8,000 hours. The samples after 8,000 hours of exposure to this test are shown in FIGS. 2(a), 2(b) and 2(c), and FIG. 4 shows that none of the samples blistered after 8,000 hours of running this test. Furthermore, there was no visible blistering or corrosion from the scribe after the 3,000 hour limit of the test as set forth by the AAMA 605.2 specification. This example shows that compositions of the present invention work as well as the two other known systems in the acetic acid salt spray test.

Example 4

A composition in accordance with the present invention was prepared by mixing 2% (by volume) of the polymeric blend of the present: invention shown in Table 4 with 2% (by volume) of the fluotitanic acid equivalent of Table 1, compound 2.

The metal used for this example was aluminum and the composition was applied by a reverse roll coat system as described above.

TABLE A

| Metal Type | Coating Composition | Paint System | 5% Salt Spray 1,000 Hours (Scribe) | 5% Salt Spray 1,000 Hours (Field) | Humidity 1,000 Hours | T-Bend Test | Reverse Impact Crosshatch | 20 Minute Boiling Water |
|---|---|---|---|---|---|---|---|---|
| Aluminum | Blend/Fluotitanic Acid | Roll Coat | 10 | 10 | | | | |
| Aluminum | Blend/Fluotitanic Acid | Roll Coat | 10 | 10 | | | | |
| Aluminum | Blend/Fluotitanic Acid | Roll Coat | 10 | 10 | | | | |
| Aluminum | Blend/Fluotitanic Acid | Roll Coat | | | Pass 10 | | | |
| Aluminum | Blend/Fluotitanic Acid | Roll Coat | | | Pass 10 | | | |
| Aluminum | Blend/Fluotitanic Acid | Roll Coat | | | | 0-T | | |
| Aluminum | Blend/Fluotitanic Acid | Roll Coat | | | | | Pass 10 | |
| Aluminum | Blend/Fluotitanic Acid | Roll Coat | | | | | Pass 10 | |
| Aluminum | Blend/Fluotitanic Acid | Roll Coat | | | | | | Pass 10 |
| Aluminum | Blend/Fluotitanic Acid | Roll Coat | | | | | | Pass 10 |
| Aluminum | Blend/Fluotitanic Acid | Roll Coat | | | | | | Pass 10 |

As can be seen from Table A, the composition performed well in the 5% salt spray test of 1,000 hours. The salt spray test is similar to the acetic acid salt spray test discussed above, except that acetic acid is not present. A sample exposed to the 5% salt spray test is rated in two ways. First, the "scribe rating" is given on a zero to 10 scale, with 10 the best and zero the worst. This rating measures the degree of expansion of corrosion from a scribe. A scribe rating of 10 indicates zero corrosion. For every one thirty-second of an inch of corrosion from the scribe, the rating is reduced by 1 point. As can be seen from Table A, each sample obtained a scribe rating of 10 in the 5% salt spray test; therefore, there was no corrosion.

The field rating of the 5% salt spray test is a measure of the blistering. Again, 10 is the best rating, meaning that there is virtually no evidence of blistering and zero is the worst. As can be seen from Table A, all three samples tested performed exceptionally in this test.

The sample treated by this composition also performed exceptionally in the humidity test, by achieving the best rating of 10. In the humidity test, a sample is exposed to 100% humidity at 100° F. for 1,000 hours, and then visually inspected for blistering. There are no scores applied to the samples prior to testing in the humidity test. A rating of 10 indicates that there is no blistering while a rating of zero indicates the worst case of blistering.

Also as evident from Table A, the sample treated by this composition performed exceptionally in the T-Bend test. This is a test for paint loss when a panel is bent back on itself to form a sharp crease. Visual observation is made of the extent of paint loss that results on the outside surface of the crease. Type "610" tape is applied to the outside radius and pulled back against itself 180° and any loss requires additional testing until no paint is lost. The result (e.g., "O-T") indicates the number of times that a panel must be bent for there to be no paint loss. "O-T," which indicates no paint loss even on the first (and sharpest) bend, is the best rating and a high number preceding a "T" is the worst rating. As indicated from Table A, this sample performed exceptionally.

The reverse impact crosshatch test includes positioning a coated test surface with the painted side down and impacting the unpainted surface with a ½ inch bar with a force measured at 24 inch-pounds, thereby deforming the test surface. The painted surface, which had been crosshatched at the impacted area, is then subjected to a tape adhesion test. Percentage paint loss is evaluated. As can be seen from Table A, a test sample treated by the composition of the present invention performed exceptionally in this test.

Three test samples were also subjected to the 20 minute boiling water test. In this test, a painted and cross-hatched panel is placed in boiling distilled water for twenty minutes. The panel is dried, and then subjected to a paint adhesion test. Once again, percentage paint loss is evaluated. As can be seen from Table A, all three samples tested using a composition of the present invention performed exceptionally.

The results of this example show that aluminum treated by a composition of the present invention, including the polymeric blend and fluotitanic acid, performs very well in a wide variety of tests.

Example 5

To show that the composition of the present invention is not limited to improving the paint adhesion and corrosion resistance of aluminum alone, two compositions of the present invention were tested on hot-dipped galvanized steel and were compared with a sample treated by a dried-in-place chrome method.

The samples were prepared as above. In particular, the same composition of the present invention used in Example 4 was prepared. A second series of samples were prepared in a similar manner except that 2% (by volume) of the ammonium zirconium carbonate equivalent of Table 1, compound 2, was used. These samples were compared with a dried-in-place chromium method. The results of these tests are shown in Table B.

TABLE B

| Metal Type | Coating Composition | Paint System | 5% Salt Spray 1,000 Hours (Scribe) | 5% Salt Spray 1,000 Hours (Field) | Humidity 1,000 Hours | T-Bend Test | 20 Minute Boiling Water |
|---|---|---|---|---|---|---|---|
| H.D. Galvinized | Blend/Fluotitanic Acid | Roll Coat | 10 | 9 | | | |
| H.D. Galvinized | Blend/Fluotitanic Acid | Roll Coat | 8 | 8 | | | |
| H.D. Galvinized | Blend/Fluotitanic Acid | Roll Coat | | | Pass 10 | | |
| H.D. Galvinized | Blend/Fluotitanic Acid | Roll Coat | | | Pass 10 | | |
| H.D. Galvinized | Blend/Fluotitanic Acid | Roll Coat | | | | 2-T | |
| H.D. Galvinized | Blend/Fluotitanic Acid | Roll Coat | | | | | Pass 10 |
| H.D. Galvinized | Blend/Ammonium-Zr-Carb. | Roll Coat | 8 | 7 | | | |
| H.D. Galvinized | Blend/Ammonium-Zr-Carb. | Roll Coat | 10 | 8 | | | |
| H.D. Galvinized | Blend/Ammonium-Zr-Carb. | Roll Coat | | | Pass 10 | | |
| H.D. Galvinized | Blend/Ammonium-Zr-Carb. | Roll Coat | | | Pass 10 | | |
| H.D. Galvinized | Blend/Ammonium-Zr-Carb. | Roll Coat | | | | 0-T | |
| H.D. Galvinized | Blend/Ammonium-Zr-Carb. | Roll Coat | | | | | Pass 10 |
| H.D. Galvinized | Dried-in-place Chromium | Roll Coat | 10 | 9 | | | |
| H.D. Galvinized | Dried-in-place Chromium | Roll Coat | 9 | 9 | | | |
| H.D. Galvinized | Dried-in-place Chromium | Roll Coat | | | Pass 10 | | |
| H.D. Galvinized | Dried-in-place Chromium | Roll Coat | | | Pass 10 | | |
| H.D. Galvinized | Dried-in-place Chromium | Roll Coat | | | | 1-T | |
| H.D. Galvinized | Dried-in-place Chromium | Roll Coat | | | | | Pass 10 |

Although the sample treated by the dried-in-place chromium method performed slightly better in the 5% salt spray test, there was no noticeable difference in the other three tests (the humidity test, the T-Bend test, and the 20 minute boiling water test). Thus, the sample treated by a composition of the present invention including the polymeric blend and either ammonium zirconium carbonate or fluotitanic acid performs comparably with a sample treated by a dried-in-place chromium method in these tests.

Example 6

A sample of aluminum extrusion treated by a traditional chromium phosphate was compared with a sample of flat aluminum extrusion treated by a composition of the present invention, including the polymeric blend and fluozirconic acid. The paint system used here was a spray system.

A composition in accordance with the present invention was prepared by mixing 1% (by volume) of the polymeric blend of the present invention (shown in Table 4) with 1% (by volume) of the hydrofluozirconic acid solution of Table 1, compound 2.

The results of these tests are shown in Table C. Tests not previously mentioned are the dry-adhesion test, the detergent test, and the muriatic test. The dry-adhesion test involves placing tape on a cross-hatched, dry sample and rapidly peeling off the tape to determine the extent of paint removal from the metal surface. The detergent test involves placing the sample in a solution of detergent for 72 hours at 100° F., and then inspecting for blistering of the edges or other visible damage. Optionally, a sample which has been exposed to the detergent test may be dried and then subject to a tape adhesion test. The muriatic test involves exposing the painted surface to 10% HCL solution. Usually, the quality and properties of the paint itself are more likely to determine how a sample performs in the muriatic test.

In comparing the results on Table C, it is evident that the sample treated by the present invention compares well with a sample treated by a traditional chromium phosphate. It should be noted that in the detergent test, not even the edges of the sample blistered for the sample treated by the composition of the present invention. This is represented by an asterisk (*) in Table C. Such blistering normally occurs in most known applications.

Example 7

The present invention was compared with a known dried-in-place chromium method, which includes a partially

TABLE C

| Metal Type | Coating Composition | Paint System | 5% Salt Spray 1,000 Hours (Scribe) | 5% Salt Spray 1,000 Hours (Field) | Humidity 1,000 Hours | 30 Minutes Boiling Water | Dry Adhesion Test | Detergent Test | Muriatic Test |
|---|---|---|---|---|---|---|---|---|---|
| Aluminum Extrusion | Chromium Phosphate | Spray | 10 | 10 | | | | | |
| Aluminum Extrusion | Chromium Phosphate | Spray | | | Pass | | | | |
| Aluminum Extrusion | Chromium Phosphate | Spray | | | | Pass | Pass | | |
| Aluminum Extrusion | Chromium Phosphate | Spray | | | | | | Pass | |
| Aluminum Extrusion | Chromium Phosphate | Spray | | | | | | | Pass |
| Flat Aluminum Extrusion | Blend/Fluozirconic Acid | Spray | 10 | 10 | | | | | |
| Flat Aluminum Extrusion | Blend/Fluozirconic Acid | Spray | 8 | 10 | | | | | |
| Flat Aluminum Extrusion | Blend/Fluozirconic Acid | Spray | | | Pass | | | | |
| Flat Aluminum Extrusion | Blend/Fluozirconic Acid | Spray | | | | Pass 10 | | | |
| Flat Aluminum Extrusion | Blend/Fluozirconic Acid | Spray | | | | | Pass 10 | | |
| Flat Aluminum Extrusion | Blend/Fluozirconic Acid | Spray | | | | | | Pass* | |
| Flat Aluminum Extrusion | Blend/Fluozirconic Acid | Spray | | | | | | | Pass |

*Indicates that not even the edges blistered.

reduced chromate and binder. The composition of the present invention used in Example 6 was prepared.

TABLE D

| Metal Type | Coating Composition | Paint System | 5% Salt Spray 1,000 Hours (Scribe) | 5% Salt Spray 1,000 Hours (Field) | Humidity 1,000 Hours | 30 Minutes Boiling Water | Dry Adhesion Test | Detergent Test | Muriatic Test |
|---|---|---|---|---|---|---|---|---|---|
| Alum. Extr. | Dried-in-place, Chromium | Spray | | | | | | Fail-pick | |
| Alum. Extr. | Dried-in-place, Chromium | Spray | | | | | Pass 8 | | |
| Alum. Extr. | Dried-in-place, Chromium | Spray | | | | | | | Pass |
| Alum. Extr. | Dried-in-place, Chromium | Spray | | | | Pass | | | |
| Alum. Extr. | Dried-in-place, Chromium | Spray | | | | | | Pass | |
| Alum. Extr. | Dried-in-place, Chromium | Spray | | | | | Pass 10 | | |
| Alum. Extr. | Dried-in-place, Chromium | Spray | | | | | | | Pass |
| Alum. Extr. | Dried-in-place, Chromium | Spray | | | | Pass | | | |
| Alum. Extr. | Dried-in-place, Chromium | Spray | | | | | | Pass | |
| Alum. Extr. | Dried-in-place, Chromium | Spray | | | | | Pass | | |
| Alum. Extr. | Dried-in-place, Chromium | Spray | | | | | | | Pass |
| Alum. Extr. | Dried-in-place, Chromium | Spray | | | | Pass | | | |
| Alum. Extr. | Dried-in-place, Chromium | Spray | | | | | | Fail | |
| Alum. Extr. | Dried-in-place, Chromium | Spray | | | | | Pass | | |
| Alum. Extr. | Dried-in-place, Chromium | Spray | | | | | | | Pass |
| Alum. Extr. | Dried-in-place, Chromium | Spray | | | | Pass | | | |
| Alum. Extr. | Dried-in-place, Chromium | Spray | 7 | 7 | | | | | |
| Alum. Extr. | Dried-in-place, Chromium | Spray | 10 | 7 | | | | | |
| Alum. Extr. | Dried-in-place, Chromium | Spray | 7 | 7 | | | | | |
| Alum. Extr. | Dried-in-place, Chromium | Spray | 10 | 10 | | | | | |
| Alum. Extr. | Blend/Fluozirconic Acid | Spray | | | | Pass 8 | Pass 10 | | |
| Alum. Extr. | Blend/Fluozirconic Acid | Spray | | | | | | Pass | |
| Alum. Extr. | Blend/Fluozirconic Acid | Spray | 10 | 10 | | | | | |
| Alum. Extr. | Blend/Fluozirconic Acid | Spray | | | Pass | | | | |
| Alum. Extr. | Blend/Fluozirconic Acid | Spray | | | | Pass 10 | Pass 10 | | |
| Alum. Extr. | Blend/Fluozirconic Acid | Spray | | | | | | Pass | |
| Alum. Extr. | Blend/Fluozirconic Acid | Spray | 10 | 10 | | | | | |
| Alum. Extr. | Blend/Fluozirconic Acid | Spray | | | Pass | | | | |
| Alum. Extr. | Blend/Fluozirconic Acid | Spray | | | | Pass 10 | Pass 10 | | |
| Alum. Extr. | Blend/Fluozirconic Acid | Spray | | | | | | Pass | |
| Alum. Extr. | Blend/Fluozirconic Acid | Spray | 10 | 10 | | | | | |
| Alum. Extr. | Blend/Fluozirconic Acid | Spray | | | Pass | | | | |

Table D shows the results of these tests. By inspecting Table D, it is clear that the sample treated by the present invention performs much better than the sample treated by the known dried-in-place chromium method. The sample treated by the present invention was particularly superior in the Detergent test and the 5% Salt Spray Test.

Example 8

Finally, samples of aluminum 5052 were treated by compositions of the present invention including the polymeric blend and fluotitanic acid, as used previously in Example 5. The results of these tests are shown on Table E.

As can be seen from analyzing these results, the sample performed exceptionally well in all tests. In fact, the only test sample which did not get the highest possible rating was the first listed sample in the 5% salt spray test, for the scribe rating. This sample received the next highest rating, a "9."

Example 9

To show that a bath of the present invention with considerably higher concentrations is attainable without insolubilization, a solution having 5.68 grams per liter of polyacrylic acid, 3.64 grams per liter of polyvinyl alcohol, 14.95 grams/liter of fluotitanic acid and 15.95 grams/liter of

TABLE D

| Metal Type | Coating Composition | Paint System | 5% Salt Spray at 95 F. (Scribe) | 5% Salt Spray at 95 F. (Field) | Humidity 100% at 100 F. 1,000 Hours | Dry Adhesion Test AAMA 603.8.85 | Wet (24 hrs.) Adhesion Test AAMA 603.8.85 | Boiling Water 1 hour | Detergent 72 Hours AAMA 603.8.85 |
|---|---|---|---|---|---|---|---|---|---|
| Aluminum Slat | Blend/Fluotitanic Acid | Roll Coat | 9 | 10 | | | | | |
| Aluminum Slat | Blend/Fluotitanic Acid | Roll Coat | 10 | 10 | | | | | |
| Aluminum Slat | Blend/Fluotitanic Acid | Roll Coat | | | Pass 10 | | | | |
| Aluminum Slat | Blend/Fluotitanic Acid | Roll Coat | | | Pass 10 | | | | |
| Aluminum Slat | Blend/Fluotitanic Acid | Roll Coat | | | | Pass 10 | | | |
| Aluminum Slat | Blend/Fluotitanic Acid | Roll Coat | | | | Pass 10 | | | |
| Aluminum Slat | Blend/Fluotitanic Acid | Roll Coat | | | | | Pass 10 | | |
| Aluminum Slat | Blend/Fluotitanic Acid | Roll Coat | | | | | Pass 10 | | |
| Aluminum Slat | Blend/Fluotitanic Acid | Roll Coat | | | | | | Pass 10 | |
| Aluminum Slat | Blend/Fluotitanic Acid | Roll Coat | | | | | | Pass 10 | |
| Aluminum Slat | Blend/Fluotitanic Acid | Roll Coat | | | | | | | Pass 10 |
| Aluminum Slat | Blend/Fluotitanic Acid | Roll Coat | | | | | | | Pass 10 | ammonia was prepared. The ammonia used was commercially available strong ammonia (26° BE) at 29.4 to 31.0% (by weight) $NH_3$ with the remainder water, sold by National Ammonia, among others.

The resulting mixture was clear, showing that it is possible to attain a clear bath of the present invention with considerably higher concentrations of polyacrylic acid and polyvinyl alcohol added with ammonia.

Also, a solution having 11.32 grams/liter polyacrylic acid, 7.25 grams grams/liter polyvinyl alcohol, 29.80 grams/liter fluotitanic acid, and 31.79 grams/liter ammonia was prepared. The resulting mixture was clear and uniform, showing that it is possible to obtain a clear bath of the present invention with considerably higher concentrations of polyacrylic acid and polyvinyl alcohol added with ammonia.

Next, a solution was obtained having 22.68 grams/liter of polyacrylic acid, 14.52 grams/liter of polyvinyl alcohol, 73.45 grams/liter of fluozirconic acid, and 53.70 grams/liter of ammonia. The resulting solution had a pH of 4.2 and was clear.

Finally, the concentrations of the solution shown at Table 4 above were obtained, except that the concentrations of polyvinyl alcohol and polyacrylic acid were doubled to 2.92 wt. % and 4.56 wt %, respectively. With ammonia at about 12 wt. % and fluozirconic acid at 14.77 wt. % included in the solution, the resulting solution was clear. However, when the same amount of fluotitanic acid was added, it was difficult to obtain a clear solution.

Example 10

A composition in accordance with the present invention was prepared having the following concentrations: (1) 5.68 grams/liter of the polyacrylic acid; (2) 3.64 grams/liter of polyvinyl alcohol; (3) 14.95 grams/liter of fluotitanic acid; and (4) 15.95 grams/liter of ammonia. As a comparison, a composition in accordance with the present invention was prepared having the following concentrations: (1) 2.33 grams/liter of the polyacrylic acid; (2) 1.49 grams/liter of polyvinyl alcohol; and (3) 6.24 grams/liter of fluotitanic acid. Also, a conventional chrome-free coating composition was obtained. The concentrations of these three compositions were equalized to 20%. Then they were subjected to a variety of tests, the results of which are shown on Table F.

harder pencil leads. A score of "H" means that the system is harder than a score of "F". The 100 Double MEK Rub test involves rubbing the painted sample 100 times with a cloth saturated with methyl ethyl ketone. The sample is examined for dissolved paint. The CCH 240 Hours test involves subjecting the sample to a temperature of 140° F., in humid conditions, for ten days. The sample is then examined.

As demonstrated by Table F, there is no difference in test results between the two compositions of the present invention, with and without ammonia. In addition, both compare favorably with the competing chrome-free composition. In particular, in the white PVC paint system, the competing chrome-free composition performed worse in the cross hatch test and the boiling water test.

Although this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from its true spirit and scope.

What is claimed:

1. A composition for treating a metal surface to improve paint adhesion and corrosion resistance, said composition comprising water and:
   a first polymer having a plurality of carboxylic functional groups;
   a second polymer having a plurality of hydroxyl groups and comprising polyvinyl alcohol;
   a compound of a Group IV-B element; and
   hydrofluoric acid.

2. A composition in accordance with claim 1, wherein the ratio of equivalents of carboxylic functional groups to hydroxyl groups is from 0.3:1.0 to 3.5:1.0.

3. A composition in accordance with claim 1, wherein the concentration of said first polymer is 0.03 to 0.9 grams/liter and the concentration of said second polymer is 0.01 to 0.6 grams/liter.

4. A composition in accordance with claim 1, wherein said first polymer is selected from the group consisting of polyacrylic acid and polymethylvinylmaleic anhydride.

5. A composition in accordance with claim 1, wherein said compound of a Group IV-B element is an acid selected from the group consisting of fluozirconic acid, fluotitanic acid and fluohafnic acid.

TABLE F

| Metal Type | Coating Composition | Paint System | Pencil Hardness | 4 Hour Boiling Water Adhesion Cross Hatch | Reverse Impact Test | Zero T-Bend Test | T-Bend After 4 hr. Boiling Water | 100 Double MEK Rubs | CCH 240 Hours | 100% Humidity Test | 5% Salt Spray Scribe/Field |
|---|---|---|---|---|---|---|---|---|---|---|---|
| Coil Stock | Blend/Fluotitanic | PVC | Pass H | Pass | Pass-30 lbs | Pass | Crack | | | | |
| Coil Stock | Blend/Fluotitanic/ ammonia | PVC | Pass H | Pass | Pass-30 lbs | Pass | Crack | | | | |
| Coil Stock | Chrome-free | PVC | Pass H | slightly ragged | Pass-30 lbs | Pass | Peel | | | | |
| Coil Stock | Blend/Fluotitanic | Fluorocarbon | Pass F | Pass | Pass-40 lbs | Pass | | Pass | Pass 10 | Pass 10 | 10, 10 |
| Coil Stock | Blend/Fluotitanic/ ammonia | Fluorocarbon | Pass F | Pass | Pass-40 lbs | Pass | | Pass | Pass 10 | Pass 10 | 10, 10 |
| Coil Stock | Chrome-free | Fluorocarbon | Pass F | Pass | Pass-40 lbs | Pass | | Pass | Pass 10 | Pass 10 | 10, 10 |

In addition to some of the tests previously discussed, the samples for this example were subjected to three new tests: the Pencil Hardness test, the 100 Double MEK Rub test and the CCH 240 Hours test. The Pencil Hardness test is a measure of the cured paint system's hardness. The test involves attempting to scratch the paint with progressively 6. A composition in accordance with claim 1 further comprising a corrosion inhibiting compound.

7. A composition in accordance with claim 6, wherein said corrosion inhibiting compound is selected from the group consisting of sodium nitrite and ammonium molybdate.

8. A composition for treating a metal surface to improve paint adhesion and corrosion resistance, said composition comprising water and:
- a first polymer having a plurality of carboxylic functional groups;
- a second polymer having a plurality of hydroxyl groups and comprising polyvinyl alcohol; and
- an aqueous solution of a compound of a Group IV-B element containing hydrofluoric acid.

9. A composition in accordance with claim 8, wherein the ratio of equivalents of carboxylic functional groups to hydroxyl groups is from 0.3:1.0 to 3.5:1.0.

10. A composition in accordance with claim 8, wherein the concentration of said first polymer is 0.03 to 0.9 grams/liter and the concentration of said second polymer is 0.01 to 0.6 grams/liter.

11. A composition in accordance with claim 8, wherein said first polymer is selected from the group consisting of polyacrylic acid and polymethylvinylmaleic anhydride.

12. A composition in accordance with claim 8, wherein said compound of a Group IV-B element is an acid selected from the group consisting of fluozirconic acid, fluotitanic acid and fluohafnic acid.

13. A composition in accordance with claim 8 further comprising a corrosion inhibiting compound.

14. A composition in accordance with claim 13, wherein said corrosion inhibiting compound is selected from the group consisting of sodium nitrite and ammonium molybdate.

15. A method for treating a metal surface to improve paint adhesion and corrosion resistance comprising contacting the metal surface with a composition comprising water and:
- a first polymer having a plurality of carboxylic functional groups;
- a second polymer having a plurality of hydroxyl groups and comprising polyvinyl alcohol; and
- a compound of a Group IV-B element; and
- hydrofluoric acid.

16. A method in accordance with claim 15, wherein the ratio of equivalents of carboxylic functional groups to hydroxyl groups is from 0.3:1.0 to 3.5:1.0.

17. A method in accordance with claim 15, wherein the concentration of said first polymer is 0.03 to 0.9 grams/liter and the concentration of said second polymer is 0.01 to 0.6 grams/liter.

18. A method in accordance with claim 15, wherein said first polymer is selected from the group consisting of polyacrylic acid and polymethylvinylmaleic anhydride.

19. A method in accordance with claim 15, wherein said compound of a Group IV-B element is an acid selected from the group consisting of fluozirconic acid, fluotitanic acid and fluohafnic acid.

20. A method in accordance with claim 15 further comprising a corrosion inhibiting compound.

21. A method in accordance with claim 20, wherein said corrosion inhibiting compound is selected from the group consisting of sodium nitrite and ammonium molybdate.

22. A method for treating a metal surface to improve paint adhesion and corrosion resistance comprising contacting the metal surface with a composition comprising water and:
- a first polymer having a plurality of carboxylic functional groups;
- a second polymer having a plurality of hydroxyl groups and comprising polyvinyl alcohol; and
- an aqueous solution of a compound of a Group IV-B element containing hydrofluoric acid.

23. A method in accordance with claim 22, wherein the ratio of equivalents of carboxylic functional groups to hydroxyl groups is from 0.3:1.0 to 3.5:1.0.

24. A method in accordance with claim 22, wherein the concentration of said first polymer is 0.03 to 0.9 grams/liter and the concentration of said second polymer is 0.01 to 0.6 grams/liter.

25. A method in accordance with claim 22, wherein said first polymer is selected from the group consisting of polyacrylic acid and polymethylvinylmaleic anhydride.

26. A method in accordance with claim 22, wherein said compound of a Group IV-B element is an acid selected from the group consisting of fluozirconic acid, fluotitanic acid and fluohafnic acid.

27. A method in accordance with claim 22 further comprising a corrosion inhibiting compound.

28. A method in accordance with claim 27, wherein said corrosion inhibiting compound is selected from the group consisting of sodium nitrite and ammonium molybdate.

* * * * *

UNITED STATES PATENT AND TRADE MARK OFFICE
CERTIFICATE OF CORRECTION

PATENT NO. : 5,859,107
DATED : January 12, 1999
INVENTOR(S) : Jones et al.

It is certified that error appears in the above-identified patent and that said Letters Patent is hereby corrected as shown below:

On title page of the patent, at "[56] References Cited", under "U.S. PATENT DOCUMENTS", delete "3,796,582    3/1974    Leahey et al."

and insert therefor

--3,796,582    3/1975    Leahey et al.--

On title page of the patent, at "[57] Abstract", line 17, delete "fluchafnic" and insert therefor --fluohafnic--.

Signed and Sealed this

Tenth Day of August, 1999

*Attest:*

Q. TODD DICKINSON

*Attesting Officer*    *Acting Commissioner of Patents and Trademarks*